United States Patent [19]

Walls, Jr. et al.

[11] 4,056,649
[45] Nov. 1, 1977

[54] ABRASION RESISTANT OPTICAL MATERIALS AND PROCESS FOR MAKING SAME

[75] Inventors: John J. Walls, Jr., Huntingdon Valley, Pa.; Richard A. McKyton, Delran, N.J.

[73] Assignee: The United States of America as represented by the Secretary of the Army, Washington, D.C.

[21] Appl. No.: 726,714

[22] Filed: Sept. 24, 1976

[51] Int. Cl.$^2$ .............................................. B05D 5/06
[52] U.S. Cl. ..................................... 428/215; 427/164; 427/165; 427/166; 427/167; 428/216; 428/333; 428/335; 428/336; 428/411; 428/433; 428/457
[58] Field of Search ............... 428/212, 215, 333, 411, 428/426, 430, 433, 216, 335, 336, 457; 427/164, 165, 166, 167; 350/175 NG, 178, 234

[56] References Cited

U.S. PATENT DOCUMENTS

| 3,811,753 | 5/1974 | Onoki | 427/164 |
| 3,971,872 | 7/1976 | Le Boeuf | 427/164 |
| 3,984,581 | 10/1976 | Dobler | 427/164 |

OTHER PUBLICATIONS

"Glass 8329 for Coating by Evaporation (containing alkali)", Scott Optical Glass, Inc., prior to Sept. 24, 1975.
"Vacuum Deposition of Thin Flims", John Wiley & Sons, 1958, p. 341.

Primary Examiner—Marion E. McCamish
Attorney, Agent, or Firm—Nathan Edelberg; Robert P. Gibson

[57] ABSTRACT

An abrasion resistant optical composite comprising a plastic substrate having a chromium layer and a glass layer sequentially deposited thereover.

4 Claims, 1 Drawing Figure

U.S. Patent
Nov. 1, 1977
4,056,649
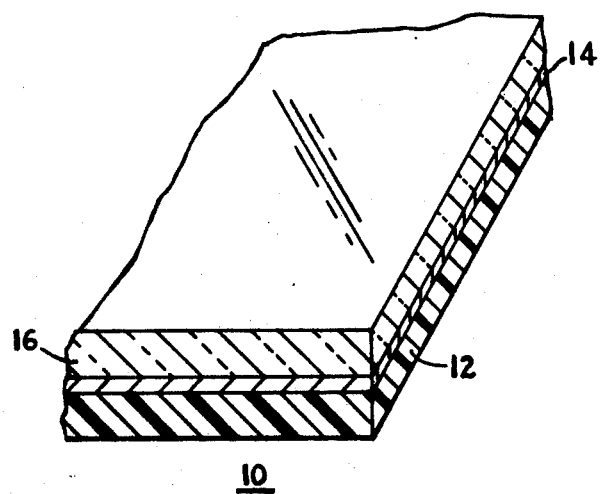

ABRASION RESISTANT OPTICAL MATERIALS AND PROCESS FOR MAKING SAME

The invention described herein may be manufactured, used and licensed by or for the Government for governmental purposes without the payment to us of any royalty thereon.

This invention relates generally to abrasion resistant optical composites and to processes for making same. The resulting composites are particularly useful for opthalmic lenses, instrument cover plates, tank periscopes and the like.

Transparent plastic materials have found increasing use in optical applications as a replacement for glass because the plastic is substantially lighter, provides a safer enviroment, and exhibits greater impact strength. A chief problem with such optical plastics, however, resides in their susceptibility to abrasion. One solution, described in U.S. Pat. No. 3,811,753, consists of a thin layer of glass deposited over a plastic substrate, the thin glass layer providing some abrasion resistance.

We have found, however, that when we deposited a single layer of glass directly onto an allyl diglycol carbonate (plastic) substrate at thickness necessary to achieve superior abrasion resistance, there occurred a tendency for peeling of the glass layer from the plastic when the composite was subjected to water immersion for 24 hours.

It is a principal object of this invention to provide composite materials having superior abrasion resistance, excellent light transmittance properties, and effective resistance to a moisture environment without peeling.

A still further object is to provide such superior abrasion resistant composite materials meeting the military requirement of withstanding temperatures ranging from −65° F to 160° F for 4 hours without adverse effects.

The aforementioned disadvantages have been substantially overcome by the novel abrasion resistant composite produced by the inventive process of the present invention. By depositing a thin chromium coating upon an allyl diglycol carbonate substrate and then depositing a glass layer over the chromium coating, we have substantially eliminated the problem of peeling of the glass layer in a water environment. The chromium bond to the glass is tenacious and permits deposition thereover of a glass layer of sufficient thickness to provide superior abrasion resistance. While chromium has been widely used to bond silver to glass and to bond aluminum to glass, to the best our knowledge, chromium has not been used prior to this invention in the bonding of glass to allyl diglycol carbonate. When attempts were made to bond glass to two other optical plastics by a chromium coating, the results were unsatisfactory and unsuited to our purpose. Thus, upon bonding glass to methyl methacrylte by a chromium interlayer, poor adherence of the chromium to methyl methacrylte occurred. A chromium interlayer bonding glass to a polycarbonate substrate provided inconsistant adherence so that when a glass layer greater than 1μm was deposited upon the chromium coating, inherent stress in the glass layer caused it to craze.

The invention will now be described in detail with reference to the accompanying drawing in which the single FIGURE is a fragmentary perspective view in section of the novel composite structure of our invention.

Referring now to the figure, composite structure 10 comprises an allyl diglycol carbonate substrate 12, a chromium interlayer 14, and a glass layer 16. Typically, chromium interlayer 14 has a thickness of about 50-200A, preferably 75A. Below about 50A inadequate bonding of interlayer 14 to glass layer 16 and substrate 12 occurs. When the interlayer is greater than about 200A in thickness, undesirable reduction in light transmittance occurs. When interlayer 14 is about 75A thick, reduction in transmittance of about only ½-1% occurs, which reduction is not readily appreciable to the human eye.

The thickness of glass layer 12 should range from about 3.25 μm to 4.5 μm and be preferably 3.75 μm. At a thickness below about 3.25 μm, the glass layer evidences undesirable susceptibility to abrasion. Above about 4.5 μm thickness, the probability of environmental breakdown of the glass layer such as peeling when subjected to a water enviroment is substantially increased. The glass layer should be composed substantially of $SiO_2$, suitable examples being quartz or Schott Glass 8329, a proprietary material made by Schott Glassworks, Inc., Doria, PA.

In the practice of this invention, allyl diglycol carbonate substrate 12 is first physically cleaned to remove large particles of contaminants therefrom by using an ultransonic bath filled with a laboratory glassware cleaning solution. Next, in order to remove microscopic and atomic contaminants therefrom, the substrate is cleaned in a vacuum chamber in a plasma discharge. After the cleaning is completed, chromium interlayer 14 is vapor deposited upon the substrate and glass layer 16 next vapor deposited upon the chromium interlayer. In the process of vapor deposition, the substrate is suspended at a distance of about 40 to 48 cm directly above chromium and glass chunks residing at the bottom of the vacuum chamber, the chunks being vaporized with an electron beam gun. A power source with a voltage of 4.5 KV to 5.5 KV, preferably 5 KV, and having an emission current of 8-15 milliamperes with a resultant power of 36-82.5 watts effects the vaporization of the chromium chunks. For vaporization of the glass chunks the voltage range is the same. The emission current, however, is 60-80 milliamperes with a resultant power of 270 to 480 watts. In either case of chromium or glass vaporization, pressures of $10^{-4}$ Torr to $10^{-7}$ Torr, preferably $10^{-6}$ to $10^{-5}$ Torr, are employed. If the power source is greater than 82.5 watts for chromium vaporization and 480 watts for the glass vaporization, deposition proceeds too rapidly to control effectively the thickness of the deposited material. Below 36 watts for the chromium vaporization, and 270 watts for the glass, the rate of deposition is undersirably sluggish. When deposition proceeds at pressures above $10^{-4}$ Torr, there is a high possibility of contaminating the deposited glass with residual atmospheric gases in the vacuum chamber. Below $10^{-7}$ Torr, there is insufficient oxygen present to achieve the oxidation of small amounts of chromium to $Cr_2O_3$, the $Cr_2O_3$ comprising less than 5% by weight of the chromium interlayer, and enhancing good bonding of it to substrate 12 and glass layer 16. The aforementioned examples are given only by way of illustration and are not to be considered in a limiting sense.

Tables I and II below indicate results of various environmental performance tests upon Schott Glass 8329 coated on allyl diglycol carbonate as a function of the thickness of the glass layer. Note the absence of a chromium interlayer in Table I.

The various tests performed consisted of the following:

The adherence test per MIL-M-13508, dated 16 Nov. 1966, consists essentially of applying a piece of adhesive tape to the surface of the glass, then pulling up the tape using a snap action, and finally inspecting for surface removal.

The abrasion test per MIL-C-675, dated 6 Jan. 1964, basically comprises rubbing an eraser, having ¼ inch diameter and a certain size and concentration pumice, back and forth 10 cycles upon a surface while applying 2-2½ lbs. pressure.

The alcohol wipe test consists of wiping the surface of the glass layer with a cheescloth soaked with methyl or ethyl alcohol, and inspecting for any chemical or physical degradation of the wiped surface.

The water immersion test per MIL-C-48497, dated 27 June 74, in essence comprises immersing a sample of the material to be tested in distilled water for 24 hours at room temperature.

TABLE I

Environmental Performance of Glass Coating
on Allyl Diglycol Carbonate
(Without Chromium Interlayer)
As a Function of Thickness of the Glass Coating

| Optical Thickness of Glass | Adherence (MIL-M-13508) | Abrasion (MIL-C-675) |
|---|---|---|
| 1 wave | No effect | scratched |
| 2 waves | " | " |
| 4 waves | " | slight improvement |
| 5 waves | " | a few very light scratches |
| 6 waves | " | a few very light scratches |
| 7 waves | " | one or two scratches |
| 8 waves | " | one or two scratches |
| 9 waves | " | one scratch |

| Optical Thickness of Glass | Alcohol Wipe | Water (MIL-C-48497) (24 hours) |
|---|---|---|
| 1 wave | No effect | small surface damage |
| 2 waves | " | " |
| 4 waves | " | " |
| 5 waves | " | " |
| 6 waves | " | " |
| 7 waves | " | " |
| 8 waves | " | film removal |
| 9 waves | " | " |

TABLE II

Environmental Performance of Glass Coating
on Allyl Diglycol Carbonate
(With a Chromium Interlayer) As a Function
of Thickness of the Glass Coating

| Optical Thickness of Glass | Adherence (MIL-M-13508) | Abrasion (MIL-C-675) |
|---|---|---|
| Cr + 1 wave | No effect | scratches |
| Cr + 5 waves | " | fine scratches |
| Cr + 8 waves | " | few scratches |
| Cr + 9 waves | " | No damage |
| Cr + 10 waves | " | No damage |

| Optical Thickness of Glass | Alcohol Wipe | Water (MIL-C-48497) (24 hours) |
|---|---|---|
| Cr + 1 wave | No effect | No effect |
| Cr + 5 waves | " | " |
| Cr + 8 waves | " | " |
| Cr + 9 waves | " | " |
| Cr + 10 waves | " | " |

$^a$1 wave = .55 μ

$^b$physical thickness (glass) = $\frac{\text{optical thickness (glass)}}{\text{refractive index (glass)}}$ $^c$refractive index of glass used is approximately 1.47

$^d$chromium interlayer has thickness of about 75A.

From a comparison of Table I and Table II, it is apparent that at a glass layer thickness of 9 waves, which is within the aforementioned range of 32.5 μm – 4.5 μm necessary for superior abrasion resistance, without a chromium interlayer, glass layer removal occurred after 24 hours of water immersion. No such peeling occurred in this interval when the chromium interlayer was used. In addition, it was noted, although not set out in Table II, that 1,000 eraser strokes back and forth, or 500 cycles, per MIL-C-675 produced but a few fine scratches on a glass coating of 10 waves thickness deposited over chromium. There was no appreciable loss in transmission of light through the composite after the 1,000 strokes.

The invention may be better understood by reference to the following detailed example.

EXAMPLE I

Physical Cleaning — A sheet of allyl diglycol carbonate, 2 inches ×2 inches × ¼ inch, is ultrasonically cleaned for 15 minutes in a vibratory bath vibrating at about 75 Kilohertz and utilizing 60 watts power. The bath contains a solution of equal volumes naphthalene and a conventional glassware cleaning detergent. The plastic sheet is removed from the ultrasonic bath with tongs, rinsed with cold tap water, and then washed with cheesecloth soaked with the aforementioned detergent. After being rinsed with tap water, the plastic sheet is rinsed with deionized water, and then suspended for about 2 minutes in a vapor phase of an acetone bath, the bath heated with a vapor degreasing unit. Then, the allyl diglycol carbonate sheet is withdrawn slowly from the vapor bath with tongs and allowed to air dry.

Plasma Cleaning — When air drying is completed, the plastic sheet is placed on a mounting fixture within a vacuum chamber. By using an oil diffusion pump and mechanical pump, the pressure within the chamber is reduced to approximately $2 \times 10^{-6}$ Torr. A micrometer needle valve disposed within the side wall of the vacuum chamber is opened to introduce a small amount of air the pressure within the chamber being adjusted to approximately 35 μm Hg. Next, glow electrodes at the bottom of the chamber, a few centimeters lateral to the glass and chromium chunks to be vaporized, are energized to 300 milliamperes. The resultant plasma collide with the bottom surface of the allyl diglycol carbonate sheet, located about 15–23 cm directly above a negative glow ring electrode which ring is located about 25 cm directly above the positive glow electrode. These plasma collisions clean the plastic sheet. The plasma cleaning is maintained for about two minutes and then stopped. Wiht the needle valve closed, the oil diffusion pump is utilized to reduce the vacuum chamber to $10^{-6}$ Torr.

Chromium Deposition — An electron beam gun (rated at 6 Kilowatts) disposed at the bottom of vacuum chamber and in alignment directly beneath the mounting fixture is loaded with chromium chunks approximately ⅛ inch × ⅛ inch × ⅛ inch in one of four hearths, the remaining three hearths loaded with Schott Glass 8329 chunks approximately ⅛ inch × ⅛ inch × ⅛ inch. Next, the electron beam gun is energized to 5KV, the resulting emitted electrons from the gun bombarding the chromium chunks vaporization thereof. An optical thickness monitor suitably placed within the vacuum chamber, monitors the thickness of the chromium to be deposited. Chromium deposition is stopped when a chromium interlayer of about 75 A is attained.

Glass Deposition — Next, the three hearths containing glass chunks are rotated sequentially to insure a uniform deposition rate, the electron beam gun being energized to about 5KV and about 70 milliamperes for the vapor deposition. When a deposited thickness of 3.75 μm is reached, glass deposition is stopped.

We claim:

1. Optical composite comprising
an allyl diglycol carbonate substrate, a chromium interlayer of about 50-200A in thickness bonded on said substrate, and a glass layer of about 3.25 μm to 4.5 μm in thickness, comprising substantially SiO$_2$, bounded on said chromium interlayer.

2. An optical composite in accordance with claim 1, wherein said chromium interlayer is about 75A thick, and said glass layer is about 3.75 μm thick.

3. Process for forming
an optical composite comprising,
depositing a chromium coating of about 50-200A in thickness upon an allyl diglycol carbonate substrate, and depositing a glass layer of about 3.25 μm to 4.5 μm in thickness, composed substantially of SiO$_2$, over said chromium coating.

4. Process according to claim 3, wherein said depositing of said chromium coating and said glass layer are effected by physical vapor deposition.

* * * * *